United States Patent
Aiba et al.

(10) Patent No.: US 10,650,932 B2
(45) Date of Patent: May 12, 2020

(54) OUT-OF-CORE NUCLEAR INSTRUMENTATION DEVICE

(71) Applicant: Mitsubishi Electric Corporation, Chiyoda-ku, Tokyo (JP)

(72) Inventors: Toshihide Aiba, Tokyo (JP); Toshimitsu Nakai, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 372 days.

(21) Appl. No.: 15/541,724

(22) PCT Filed: Mar. 5, 2015

(86) PCT No.: PCT/JP2015/056500
§ 371 (c)(1),
(2) Date: Jul. 6, 2017

(87) PCT Pub. No.: WO2016/139797
PCT Pub. Date: Sep. 9, 2016

(65) Prior Publication Data
US 2018/0005715 A1 Jan. 4, 2018

(51) Int. Cl.
*G21C 17/108* (2006.01)
*G21C 7/36* (2006.01)
(Continued)

(52) U.S. Cl.
CPC .............. *G21C 17/108* (2013.01); *G21C 7/36* (2013.01); *G21D 1/02* (2013.01); *G21D 3/10* (2013.01); *Y02E 30/39* (2013.01)

(58) Field of Classification Search
CPC .......... G21C 17/108; G21C 7/36; G21D 3/10; G21D 1/02; G01T 3/00
(Continued)

(56) References Cited

U.S. PATENT DOCUMENTS 3,898,466 A * 8/1975 Kawashima .............. G01T 3/00
250/392
2012/0201339 A1 8/2012 Nakamura et al.

FOREIGN PATENT DOCUMENTS

JP 50-94954 A 7/1975
JP 61-22293 A 1/1986
(Continued)

OTHER PUBLICATIONS

International Search Report (PCT/ISA/210) dated May 19, 2015, by the Japanese Patent Office as the International Searching Authority for International Application No. PCT/JP2015/056500.

*Primary Examiner* — Jack W Keith
*Assistant Examiner* — Daniel Wasil
(74) *Attorney, Agent, or Firm* — Buchanan Ingersoll & Rooney PC

(57) ABSTRACT

A detector signal-processing circuit comprises the following: a current/voltage conversion part that converts the current value of a neutron detector to a voltage value; a variable gain amplification part that performs amplification by a first-step variable gain using a D/A converter; a current level response-use resistance circuit that selects the measurement range in accordance with the voltage value; temperature measurement units for measuring the temperature of the resistance circuit for current level response; a temperature compensation part for commanding gain compensation by the D/A converter on the basis of the measured temperature; and a selective adjustment control part for selective control of the measurement range and adjustment of the variable gain of the variable gain amplification part. Due to this configuration, neutron flux can be measured with high precision while maintaining a constant output precision, before and after switching of the measurement range.

8 Claims, 5 Drawing Sheets

(51) Int. Cl.
*G21D 1/02* (2006.01)
*G21D 3/10* (2006.01)
(58) Field of Classification Search
USPC .................................................. 376/255, 259
See application file for complete search history.

(56) References Cited

FOREIGN PATENT DOCUMENTS

| | | |
|---|---|---|
| JP | 61-56926 A | 3/1986 |
| JP | 3-243824 A | 10/1991 |
| JP | 2012-163362 A | 8/2012 |

\* cited by examiner

OUT-OF-CORE NUCLEAR INSTRUMENTATION DEVICE

TECHNICAL FIELD

The present invention relates to an out-of-core nuclear instrumentation device which measures and monitors an output level of a nuclear reactor by neutron flux detected by a neutron detector installed outside a nuclear reactor vessel.

BACKGROUND ART

The out-of-core nuclear instrumentation device monitors an operation state at a time of a nuclear reactor startup and an output operation by continuously monitoring neutron flux with a neutron detector installed inside a primary shield of a nuclear reactor and transmits an alarm signal and an emergency shutdown signal of the nuclear reactor to protect the nuclear reactor at a time of a nuclear reactor abnormality. The out-of-core nuclear instrumentation device is configured to include the neutron detector which outputs a current value according to a size of the neutron flux by mainly measuring the neutron flux and an out-of-core nuclear instrumentation board which processes a calculation of the output current value and transmits the alarm signal or the like.

In general, since the neutron flux ranging from a stop state of the nuclear reactor outside a furnace to an output operation covers in a very wide range of levels by 10 to 11 digits, a measurement area of the neutron flux is divided into three areas of a neutron source area, an intermediate area, and an output area according to an output level of the furnace and the respective areas are overlapped with each other to continuously monitor the entire area in the out-of-core nuclear instrumentation device. For this reason, structures and functions of the neutron detector and the out-of-core nuclear instrumentation board are different for each area and a detector signal-processing circuit is used for an operational processing of the output area.

Even when an output current of the neutron detector is very small, in order to output a voltage level according to an output level of the furnace and obtain a measured value with high precision, for example, the out-of-core nuclear instrumentation device of PTL 1 includes the detector signal-processing circuit for operational-processing the current value measured by the neutron detector and outputting a state of the neutron flux during operation, in which the detector signal-processing circuit includes a current/voltage conversion part which converts the current value converted by the neutron detector into a voltage value according to the current value and a variable gain amplification part which has an operational amplifier including a current level response-use resistance circuit capable of selecting a gain and a D/A converter adjusting the gain and amplifies the voltage value converted by the current/voltage conversion part. Due to this configuration, it is possible to accurately expand a width of the neutron detector current which can be measured.

CITATION LIST

Patent Literature

[PTL 1] JP-A-2012-163362

SUMMARY OF INVENTION

Technical Problem

However, the out-of-core nuclear instrumentation device in the related art of PTL 1 is configured to select a gain of the current value converted by the neutron detector by switching a measurement range in the current level response-use resistance circuit for outputting the voltage level according to the output level of the furnace, and each of resistors is used by the selected measurement range. However, since there is an instrumental error in a temperature characteristic of each of the resistors, even when the resistors are used under the same temperature environment, there is a problem that variations occur in precision of the output voltage from the detector signal-processing circuit due to influence of the instrumental error of the temperature characteristics of the resistors when the measurement range is switched.

The present invention is to solve the above problem, and an object of the present invention is to provide the out-of-core nuclear instrumentation device capable of measuring the neutron flux with high precision while maintaining a constant output precision, even before and after switching the measurement range.

Solution to Problem

In order to solve the above problem, an out-of-core nuclear instrumentation device according to the present invention includes a detector signal-processing circuit that converts neutron flux leaking from a nuclear reactor vessel into a current value and performs a measurement processing on the neutron flux, the neutron flux being detected by a neutron detector disposed outside the nuclear reactor vessel, in which the detector signal-processing circuit is configured to include a current/voltage conversion part that converts the current value into a voltage value, a variable gain amplification part that amplifies the voltage value with a variable gain by a D/A converter, a measurement range selection part that is provided in the current/voltage conversion part or the variable gain amplification part and selects a measurement range according to the current value, a temperature measurement unit that measures a temperature of the measurement range selection part, a temperature compensation part that outputs a gain compensation value to the D/A converter based on the temperature, and a selective adjustment control part that adjusts and controls a gain of the D/A converter with selective control of the measurement range and the gain compensation value.

Advantageous Effects of Invention

According to the out-of-core nuclear instrumentation device of the present invention, there is an effect that it is possible to grasp a precise state of the neutron flux and to obtain a measurement value with high precision while maintaining a constant output value precision of a variable gain amplification part, even before and after switching of the measurement range by compensating a gain even if there is temperature dependency associated with measurement range switching.

DESCRIPTION OF EMBODIMENTS

Hereinafter, an out-of-core nuclear instrumentation device according to embodiments of the present invention will be described in detail with reference to FIGS. 1 to 5.

Embodiment 1

Figure 1:
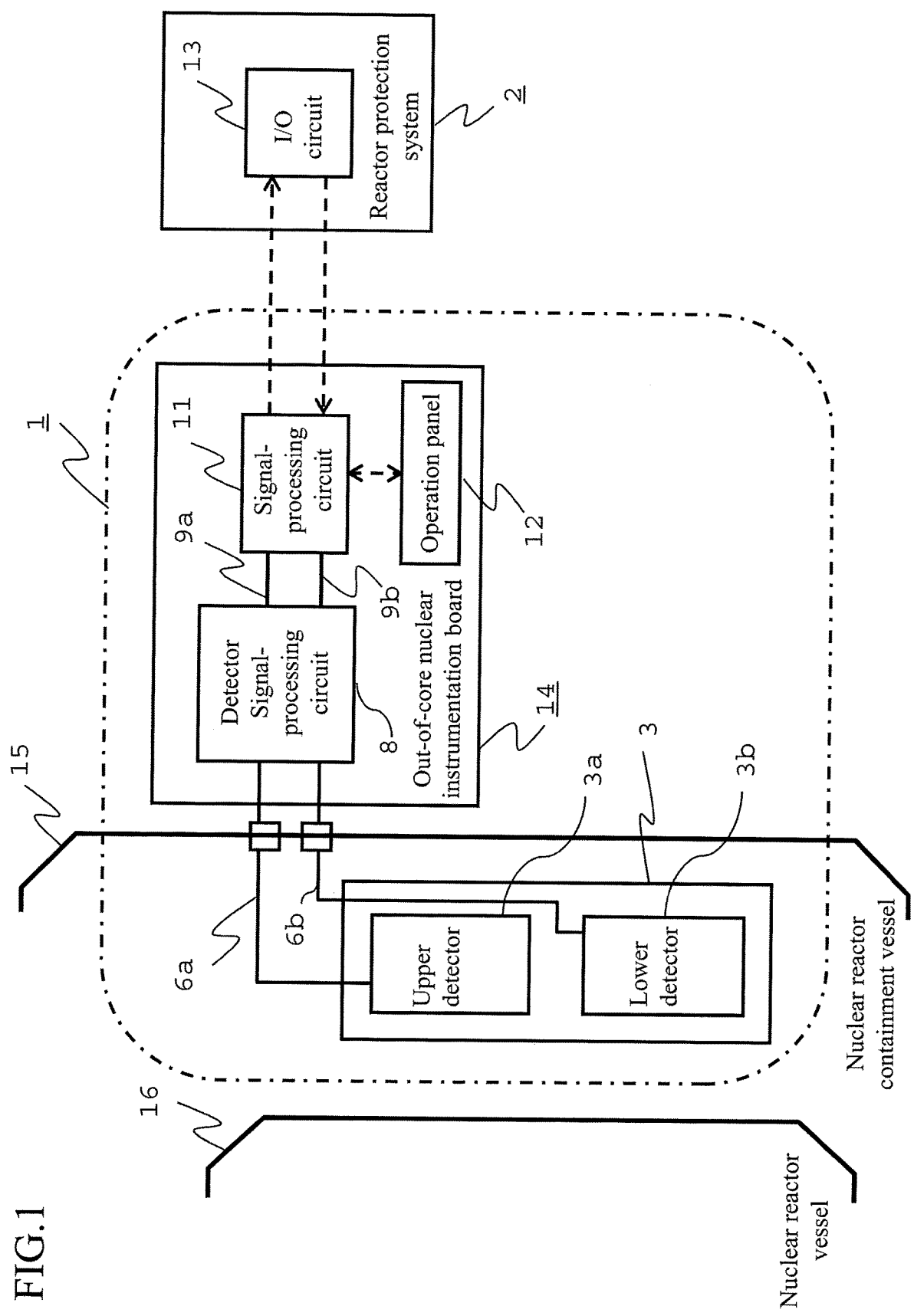
FIG. 1 is a schematic configuration diagram of an out-of-core nuclear instrumentation system including an out-of-core nuclear instrumentation device according to Embodiment 1.
Figure 2:
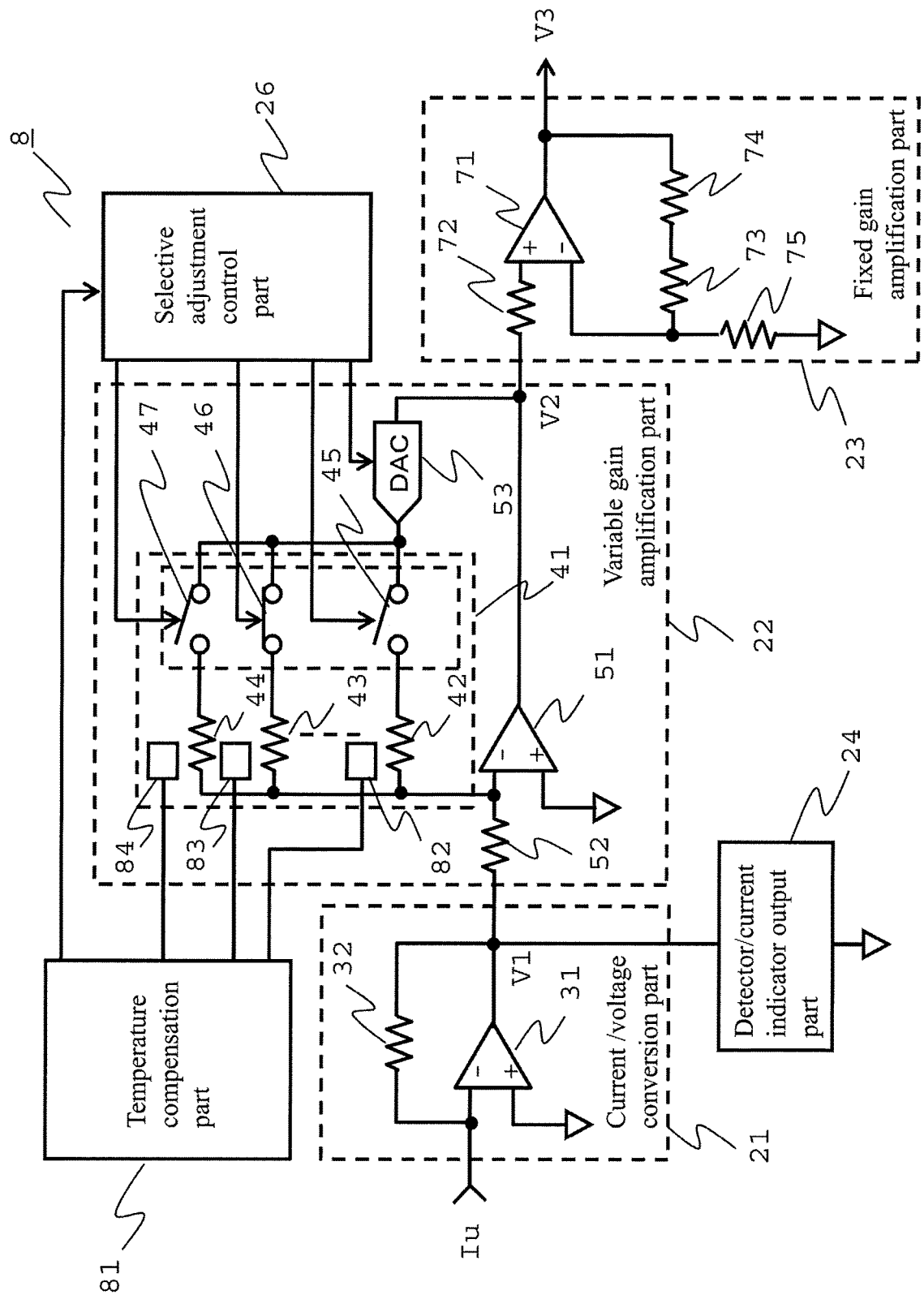
FIG. 2 is a configuration diagram of a detector signal-processing circuit in Embodiment 1.

FIG. 1 is a schematic configuration diagram of an out-of-core nuclear instrumentation system including the out-of-core nuclear instrumentation device according to Embodiment 1 and FIG. 2 is a configuration diagram of a detector signal-processing circuit of the out-of-core nuclear instrumentation device.

First, a configuration of an out-of-core nuclear instrumentation device 1 according to Embodiment 1 will be described using the schematic configuration diagram of the out-of-core nuclear instrumentation system of FIG. 1. The out-of-core nuclear instrumentation device 1 is configured to include a neutron detector 3 which is disposed in a periphery outside a nuclear reactor vessel 16 installed inside a nuclear reactor containment vessel 15, detects a neutron leaking from the nuclear reactor vessel 16, and converts the neutron into a current value, a detector signal-processing circuit 8 which processes the current value detected by the neutron detector 3, a signal-processing circuit 11 for a signal conversion processing of an output voltage of the detector signal-processing circuit 8, and an operation panel 12 for exchanging signals with the signal-processing circuit 11. Here, the neutron detector 3 is configured to include an upper detector 3a which detects the neutron leaking from an upper part of the nuclear reactor vessel 16 and converts the neutron into the current value and a lower detector 3b which detects the neutron leaking from a lower part of the nuclear reactor vessel 16 and converts the neutron into the current value. The current value converted by the upper detector 3a is input to the detector signal-processing circuit 8 via an upper detector cable 6a and the current value converted by the lower detector 3b is input to the detector signal-processing circuit 8 via a lower detector cable 6b. The detector signal-processing circuit 8, the signal-processing circuit 11, and the operation panel 12 are accommodated inside an out-of-core nuclear instrumentation board 14 installed outside the nuclear reactor containment vessel 15.

A processing circuit corresponding to the upper detector 3a and a processing circuit corresponding to the lower detector 3b are provided in the detector signal-processing circuit 8, respectively. The detector signal-processing circuit 8 converts the current values into an output voltage 9a of the upper detector 3a and an output voltage 9b of the lower detector 3b and outputs the converted current values. These output voltages 9a and 9b are input to the signal-processing circuit 11 inside the out-of-core nuclear instrumentation board 14. The signal-processing circuit 11 performs processes such as an analog/digital (A/D) conversion and an engineering value conversion, and obtained various signals are output to the operation panel 12 or an input/output circuit 13 inside a nuclear reactor protection system 2 outside the out-of-core nuclear instrumentation device 1.

A circuit configuration of the detector signal-processing circuit 8 of the out-of-core nuclear instrumentation device according to Embodiment 1 will be described in detail with reference to FIG. 2. As described above, the detector signal-processing circuit 8 includes the processing circuit of the upper detector 3a and the processing circuit of the lower detector 3b. However, since these processing circuits have the same circuit configuration, FIG. 2 shows the circuit configuration of one of these processing circuits in the detector signal-processing circuit 8. The detector signal-processing circuit 8 is configured to include, for example, a current/voltage (I/E) conversion part 21 which converts a current value Iu into which a value of the neutron flux detected by the upper detector 3a is converted into a voltage value V1, a detector/current indicator output part 24 which displays the voltage value V1 converted by the current/voltage conversion part 21, a variable gain amplification part 22 which amplifies the voltage value V1 with a variable gain of a first stage by a digital/analog (D/A) converter 53 to obtain a voltage value V2, a current level response-use resistance circuit 41 which is provided in the variable gain amplification part 22 and is a measurement range selection part for selecting a measurement range according to the voltage value V1, temperature measurement units 82, 83, and 84 which measure a temperature of the current level response-use resistance circuit 41, a temperature compensation part 81 which commands gain compensation to the D/A converter 53 based on the measured temperature, a selective adjustment control part 26 which adjusts a variable gain of the variable gain amplification part 22 and selective control of the measurement range, and a fixed gain amplification part 23 which amplifies the voltage value V2 with a fixed gain of a second stage to obtain a voltage value V3. Here, although a case where the fixed gain amplification part 23 is disposed after the variable gain amplification part 22 is described, the variable gain amplification part 22 may be disposed after the fixed gain amplification part 23.

Regarding a function of the detector signal-processing circuit 8, first, the current Iu measured by the neutron detector 3 is input to an inverting amplifier 31 using an operational amplifier in the current/voltage conversion part 21 and the voltage value V1 according to the current Iu is output. 32 is a resistor. In FIG. 2, gains of the current/voltage conversion part 21 and the fixed gain amplification part 23 which will be described below are constant. Next, a detector current is displayed on the detector/current indicator output part 24 by the voltage value V1 and the voltage value V1 is input to an inverting amplifier 51 provided in the operational amplifier of the variable gain amplification part 22.

In the variable gain amplification part 22, a selective adjustment control part 26 adjusts a gain of the D/A converter 53 to correct the voltage value V3 in advance for a voltage value according to a furnace output, and accordingly the voltage value V3 of the detector signal-processing circuit 8 is determined. That is, the selective adjustment control part 26 adjusts a gain width of the variable gain amplification part 22 based on a value of the detector/current indicator output part 24 for outputting and displaying the voltage value V1 into which the detector current Iu is converted by fixed gain amplification of the current/voltage conversion part 21. This adjustment is to be performed after the neutron detector 3 (see FIG. 1) is installed and to absorb the furnace output, a leakage of the neutrons from the nuclear reactor vessel 16 (see FIG. 1), and detection precision generated by an error or an install location of the installed detector. This adjustment is performed by an operator through the selective adjustment control part 26 based on a relationship between the furnace output and the detector/current indicator output part 24 obtained by another device or the like (for example, an in-of-core nuclear instrumentation device or an in-of-core nuclear temperature instrumentation device). In a case of automating adjustment operation, a signal of the voltage value of the detector/current indicator output part 24 and a signal of the furnace output included in the nuclear reactor protection system 2 (FIG. 1 or an instrumentation system of another nuclear power plant not shown) may be input to the selective adjustment control part 26, a gain width may be calculated from these values, and a gain of the D/A converter 53 may be adjusted.

The D/A converter 53 is an electronic circuit (for example, 12 bits circuit) which converts a digital electric signal from the selective adjustment control part 26 into an analog electric signal (resistance value) and can convert the signal into a resistance value as fine as approximately $1/10,000$. The voltage value V2 of an output of the variable gain amplification part 22 is amplified by an amplifier 71 of the fixed gain amplification part 23 and the voltage value V3 of the output signal is input to the signal-processing circuit 11 (see FIG. 1). Here, since the voltage value V3 of the output signal is a voltage value corresponding to the furnace output (for example, a voltage value 3.3 V corresponding to a furnace output of 100%) and a voltage value of a certain level corresponding to the furnace output is required for an operational processing after the signal-processing circuit 11, the detector current Iu is converted into a voltage value and amplified by the detector signal-processing circuit 8. 41 is the current level response-use resistance circuit capable of selecting a gain according to the measurement range, and 52 and 72 to 75 are resistors.

The current level response-use resistance circuit 41 switches the measurement range and is configured to include a parallel body in which a plurality of serial bodies in which resistors and switches (analog switches) are connected in series are connected in parallel. 42 to 44 are resistors and 45 to 47 are switches. With this, the switches 45 to 47 can be selected and closed to make a high resistance circuit for a low current level response. The current level response-use resistance circuit 41 can also be configured to include variable resistor.

A gain of the inverting amplifier 51 can be adjusted by selecting the resistors of the current level response-use resistance circuit 41. For example, if the resistor 42=R1, the resistor 43=R2, and the resistor 44=R3 and the resistance value is converted by one digit in stages such as R1, . . . , R2, and R3=$1/100$R, . . . , 10R, and 100R, the selective adjustment control part 26 selectively turns on and off the switches, and the desired resistor is selected, it is possible to widen the gain width of the variable gain amplification part 22 as compared with a case of the fixed resistor. In a case where the current Iu measured by the neutron detector 3 is small, the large resistance value is selected.

A gain of the variable gain amplification part 22 can be varied by adjusting the resistance value of the D/A converter 53 with the digital electric signal by the selective adjustment control part 26. If the resistance value is adjusted by only the D/A converter 53 using the current level response-use resistance circuit 41 as a fixed resistor, in a case where a lower limit of a current input range falls, for example, to 1 μA, a voltage change width per a count value for gain setting (digital electric signal) in the D/A converter 53 is increased and precision deteriorates. For this reason, FIG. 2 has a two stage serial configuration of the current level response-use resistance circuit 41 capable of selecting a gain and the D/A converter 53 for adjusting the gain. It is possible to adjust a gain with high precision by selecting a large gain by the current level response-use resistance circuit 41 and finely adjusting the gain by the D/A converter 53.

Here, since there is an instrumental error in temperature characteristics of the resistors 42, 43, and 44 constituting the current level response-use resistance circuit 41 selecting the gain of the variable gain amplification part 22 by the measurement range, a temperature of each of the resistors is measured by the temperature measurement units 82, 83, and 84 and the temperature compensation part 81 commands gain compensation for the selected resistor to the selective adjustment control part 26 based on the measured temperatures. Accordingly, the selective adjustment control part 26 issues a command to the D/A converter 53 to perform gain compensation and gain adjustment. As a result, even if there is the instrumental error in the temperature characteristic of each of the resistors under the same temperature environment, it is possible to suppress the occurrence of variations in precision of a voltage value of the output from the detector signal-processing circuit 8.

Next, selection of the current level response-use resistance circuit 41 by the selective adjustment control part 26 of the variable gain amplification part 22 and adjustment of the D/A converter 53 will be described. When the neutron detector current Iu corresponding to a furnace output of 100% level is input to the current/voltage conversion part 21, the Iu is converted into the voltage value V1 and output by the inverting amplifier 31. Further, the detector current is displayed on the detector/current indicator output part 24 and the voltage value V1 is input to the inverting amplifier 51 of the variable gain amplification part 22. At this time, a resistance value in the current level response-use resistance circuit 41 of the inverting amplifier 51 of the variable gain amplification part 22 is selectively switched by a current level (detector current displayed by detector/current indicator output part 24), the resistance value of the D/A converter 53 is adjusted, and the gain of the variable gain amplification part 22 is changed, so that it is possible to adjust the voltage value V3 of the output of the detector signal-processing circuit 8 to a required voltage level (for example, V3=3.3 V).

That is, in a case where the measured current is very small and the voltage value V3 of the output of the detector signal-processing circuit 8 does not reach to the required voltage level, the resistance value is switched by selecting the resistors 42 to 44 of the current level response-use resistance circuit 41 from on and off of the switches 45 to 47 and the gain of the variable gain amplification part 22 is further changed by adjusting a resistance value of the D/A converter 53, so that it is possible to adjust the voltage value V3 of the output of the detector signal-processing circuit 8 to the required voltage level. In addition, it is possible to finely adjust a resistance value for including the resistance value of the D/A converter 53, a resistance value selected by the current level response-use resistance circuit 41, and an on-resistance value of the switch by adjusting the D/A converter 53. For this reason, since the gain width of the variable gain amplification part 22 can be made larger and accurately changed by selective adjustment control compared to the related art, a width of the current of the neutron detector 3 which can be measured can be increased as a result.

The out-of-core nuclear instrumentation device using the detector signal-processing circuit 8 including the variable gain amplification part 22 in which the gain is selectively adjusted as described above will be described. When the neutron detector current Iu during nuclear reactor operation is input to the current/voltage conversion part 21, the Iu is output as the voltage value V1 by the inverting amplifier 31. Next, the detector current is displayed on the detector/current indicator output part 24 and the voltage value V1 is input to the inverting amplifier 51 of the variable gain amplification part 22. The voltage value V1 is amplified by the variable gain amplification part 22 of which a gain performs the selective adjustment control, so that the voltage value V2 is obtained. The voltage value V1 is amplified by the fixed gain amplification part 23, so that the output voltage V3 is obtained. When the furnace output is 100%, if the output voltage V3 is the required voltage level set in advance, a nuclear reactor is operated normally, but if the output voltage V3 exceeds the set required voltage level and an abnormality is detected, an alarm signal and a signal for emergency shutdown of the nuclear reactor are output.

Further, including the temperature measurement units 82, 83, and 84 and the temperature compensation part 81 enables to measure the current with high precision by the temperature measurement units 82, 83, and 84 measuring sequential temperatures, by the temperature compensation part 81 determining a compensation value of each of the resistors 42, 43, and 44, and by adjusting the output of the D/A converter 53. A matrix table of the temperature characteristic of each of the resistors is stored in the temperature compensation part 81, a compensation value at each of the temperatures in consideration of comparative adjustment of the temperature characteristics between the resistors is transmitted to the selective adjustment control part 26, and an output value of the D/A converter 53 is adjusted. Due to this configuration, it is realized in that individual differences of H/W are reduced, measurement precision of a minimum current is improved, at the same time variations in precision among the respective gains are eliminated, and constant precision in all measurement ranges is realized.

As the temperature measurement units 82 to 84 of Embodiment 1, it is possible to apply a normal temperature measurement device such as thermopile or the like.

Figure 3:
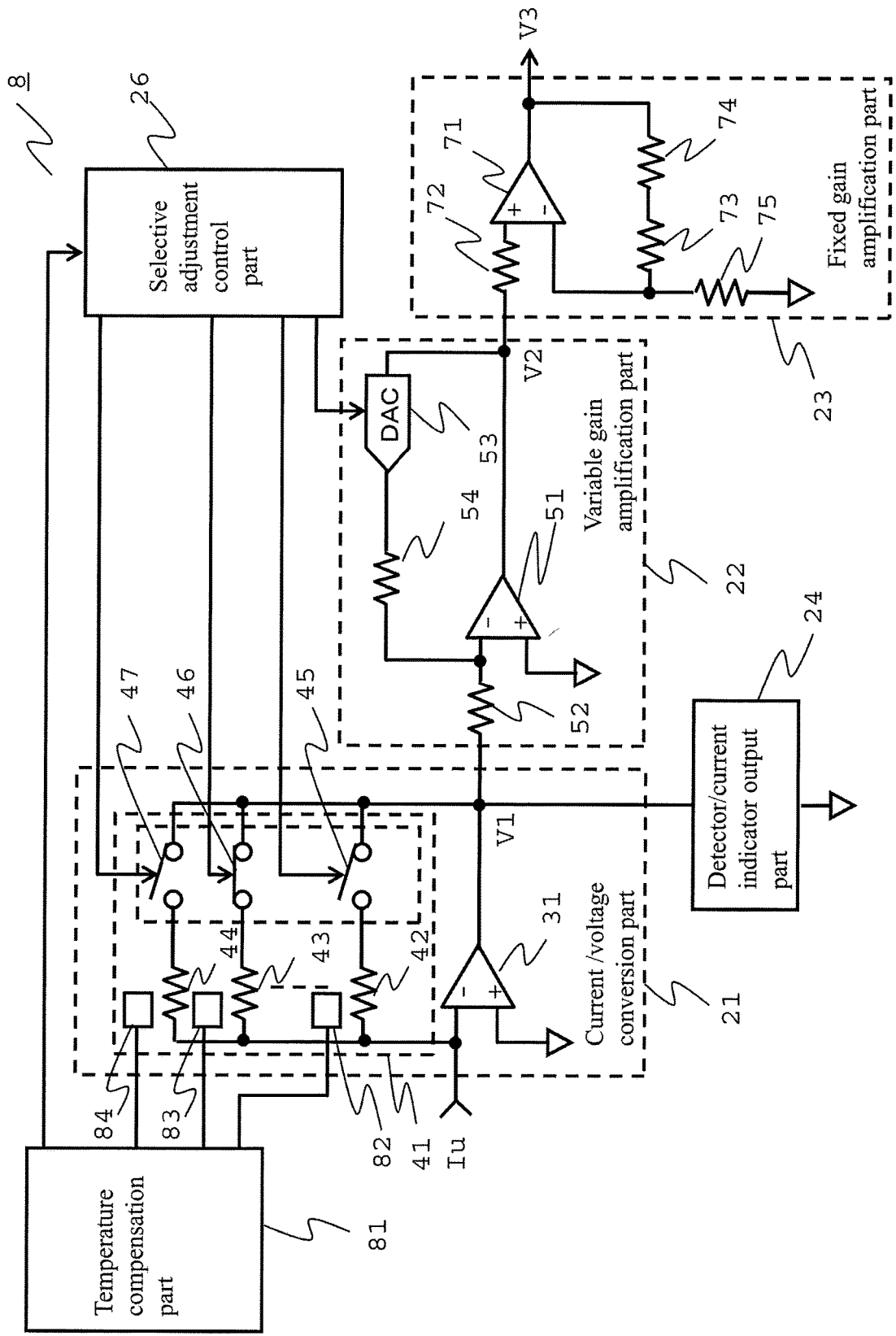
FIG. 3 is a configuration diagram of a detector signal-processing circuit showing another aspect in Embodiment 1.

In addition, FIG. 3 shows another aspect according to Embodiment 1, in which the current level response-use resistance circuit 41 is provided in the current/voltage conversion part 21 instead of the variable gain amplification part 22 and the same effect as the above-described embodiment can be expected.

According to the out-of-core nuclear instrumentation device of Embodiment 1, there is an effect that a gain of a variable gain amplification part can be switched by a measurement range selection according to the output level of a furnace, and occurrence of variations in precision of the voltage value of the output from the detector signal-processing circuit is suppressed, and the neutron flux can be measured with high precision while maintaining a constant output precision even before and after switching the measurement range by measuring a temperature of the resistors of the current level response-use resistance circuit used for the measurement range selection by the temperature measurement unit, and performing gain compensation by the instrumental error of the temperature characteristics of the resistors.

Embodiment 2

Figure 4:
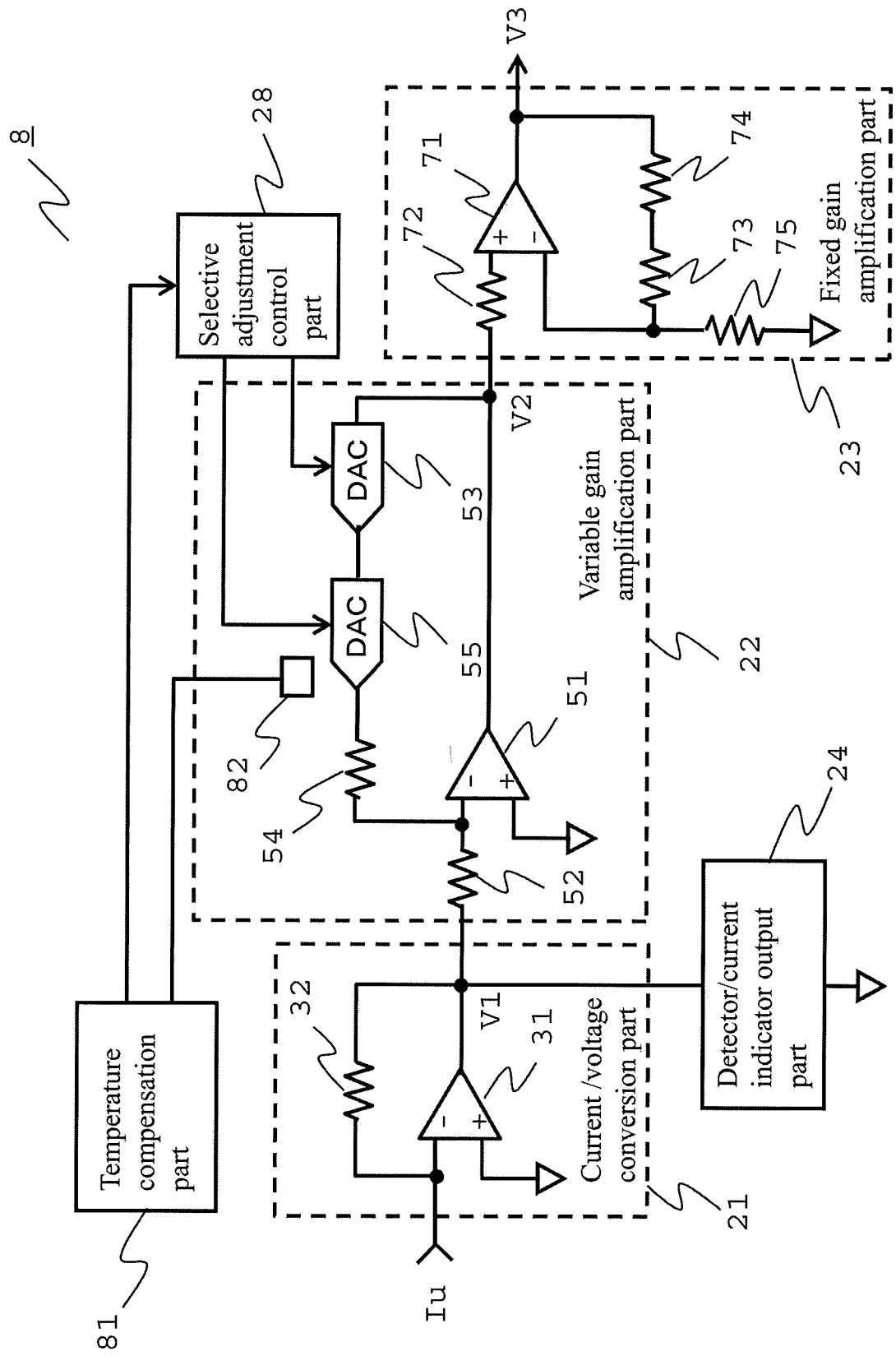
FIG. 4 is a configuration diagram of a detector signal-processing circuit according to Embodiment 2.

FIG. 4 is a configuration diagram of a detector signal-processing circuit of an out-of-core nuclear instrumentation device according to Embodiment 2. A difference from the detector signal-processing circuit of Embodiment 1 is that in Embodiment 1, the current level response-use resistance circuit 41 is used for the measurement range selection, but in Embodiment 2, the current level response-use resistance circuit 41 is changed to a D/A converter 55. Since the other constituent elements are the same as those in Embodiment 1 except that the temperature measurement unit becomes one and a selective adjustment control part 28 of instructing the D/A converter 55 for a temperature compensation value is provided, descriptions will be omitted.

Since the switch of the current level response-use resistance circuit 41 which is the measurement range selection part is changed to the D/A converter 55, the matrix table for comparing the temperature characteristics between the resistors is not necessary. Based on a temperature measured by the temperature measurement unit 82, a compensation value compensating for the single temperature characteristics of the D/A converter 55 is stored in the temperature compensation part 81, a predetermined gain compensation value is transmitted from the temperature compensation part 81 to the selective adjustment control part 28, and gain compensation is performed to adjust the output value of the D/A converter 53. The D/A converter 55 may be the variable resistor. Due to this configuration, a configuration of the measurement range switching part is simplified, and there is also an effect that the gain adjustment is easy.

According to the out-of-core nuclear instrumentation device of Embodiment 2 in the same manner as Embodiment 1, there is an effect that a gain of a variable gain amplification part can be switched by a measurement range selection according to the output level of a furnace, and occurrence of variations in precision of the voltage value of the output from the detector signal-processing circuit is suppressed, and the neutron flux can be measured with high precision while maintaining the constant output precision even before and after switching the measurement range by measuring a temperature of the D/A converter used for the measurement range selection by the temperature measurement unit, and performing gain compensation.

Embodiment 3

Figure 5:
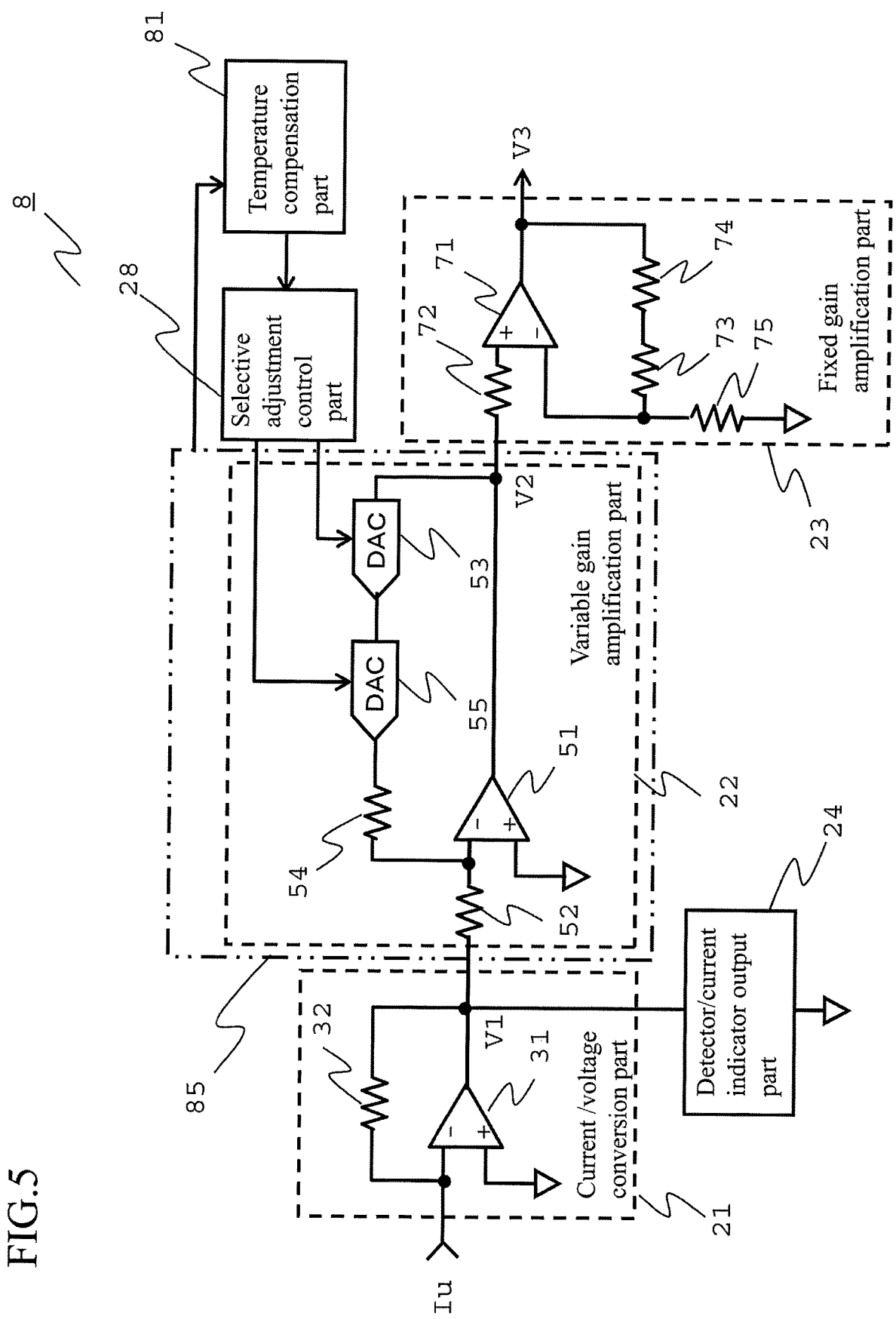
FIG. 5 is a configuration diagram of a detector signal-processing circuit according to Embodiment 3.

FIG. 5 is a configuration diagram of a detector signal-processing circuit of an out-of-core nuclear instrumentation device according to Embodiment 3. A difference from the detector signal-processing circuit of Embodiment 2 is that in Embodiment 2, the temperature of the D/A converter 55 used for the gain selection is measured by the temperature measurement unit 82 and compensated by the temperature compensation part 81, but in Embodiment 3, a constant temperature oven 85 is used instead of the temperature measurement unit 82. Due to this configuration, since the other constituent elements are the same as those in Embodiment 2 except that the temperature measurement unit 82 is not necessary, descriptions will be omitted.

The D/A converter 55 for selecting the measurement range is put in, for example, the constant temperature oven 85 which is a constant temperature control part. Based on a constant temperature control temperature, a constant compensation value is transmitted from the temperature compensation part to the selective adjustment control part 26 and gain compensation is performed to adjust the output value of the D/A converter 53.

According to the out-of-core nuclear instrumentation device of Embodiment 3 in the same manner as Embodiment 1, there is an effect that a gain of a variable gain amplification part can be switched by a measurement range selection according to the output level of a furnace and, occurrence of variations in precision of the voltage value of the output from the detector signal-processing circuit is suppressed, and the neutron flux can be measured with high precision while maintaining the constant output precision even before and after switching the measurement range by putting the D/A converter used for the measurement range selection in the constant temperature oven, and performing gain compensation based on a temperature of the constant temperature oven.

In the present invention, within the scope of the invention, it is possible to freely combine each of the embodiments and to appropriately deform or omit each of the embodiments.

In addition, in the drawings, the same reference numerals denote the same or corresponding parts.

REFERENCE SIGNS LIST 1 out-of-core nuclear instrumentation device
2 nuclear reactor protection system
3 neutron detector
8 detector signal-processing circuit
11 signal-processing circuit
12 operation panel
13 input/output circuit
14 out-of-core nuclear instrumentation board
15 nuclear reactor containment vessel
16 nuclear reactor vessel
21 current/voltage conversion part
22 variable gain amplification part
23 fixed gain amplification part
24 detector/current indicator output part
26, 28 selective adjustment control part
31, 51 inverting amplifier
41 current level response-use resistance circuit
32, 42 to 44, 52, 54, 72 to 75 resistor
45 to 47 switch
53, 55 D/A converter
71 amplifier
81 temperature compensation part
82 to 84 temperature measurement unit
85 constant temperature oven

The invention claimed is:

1. An out-of-core nuclear instrumentation device comprising:
a detector signal-processing circuit that converts neutron flux leaking from a nuclear reactor vessel into a current value and performs a measurement processing on the neutron flux, the neutron flux being detected by a neutron detector disposed outside the nuclear reactor vessel,
wherein the detector signal-processing circuit comprises:
a current/voltage conversion part that converts the current value into a voltage value,
a variable gain amplification part that amplifies the voltage value with a variable gain by a digital-to-analog (D/A) converter,
a measurement range selection part that is provided in the current/voltage conversion part or the variable gain amplification part and selects a measurement range according to the current value,
a temperature measurement unit that measures a temperature of the measurement range selection part,
a temperature compensation part that outputs a gain compensation value to the D/A converter based on the temperature, and
a selective adjustment control part that adjusts and controls a gain of the D/A converter with selective control of the measurement range and the gain compensation value.

2. The out-of-core nuclear instrumentation device according to claim 1,
wherein the measurement range selection part comprises a current level response-use resistance circuit in which a plurality of serial bodies in which resistors and switches are connected in series are connected in parallel.

3. The out-of-core nuclear instrumentation device according to claim 1,
wherein the measurement range selection part comprises a second D/A converter capable of selecting a gain according to the measurement range.

4. The out-of-core nuclear instrumentation device according to claim 3, further comprising:
a constant temperature control part that performs constant temperature control in order to keep the variable gain amplification part at a constant temperature.

5. The out-of-core nuclear instrumentation device according to claim 1, further comprising:
a fixed gain amplification part that is connected with the variable gain amplification part in series and amplifies an output of the variable gain amplification part with a fixed gain.

6. The out-of-core nuclear instrumentation device according to claim 2, further comprising:
a fixed gain amplification part that is connected with the variable gain amplification part in series and amplifies an output of the variable gain amplification part with a fixed gain.

7. The out-of-core nuclear instrumentation device according to claim 3, further comprising:
a fixed gain amplification part that is connected with the variable gain amplification part in series and amplifies an output of the variable gain amplification part with a fixed gain.

8. The out-of-core nuclear instrumentation device according to claim 4, further comprising:
a fixed gain amplification part that is connected with the variable gain amplification part in series and amplifies an output of the variable gain amplification part with a fixed gain.

* * * * *